United States Patent [19]

Weaver

[11] Patent Number: 4,606,686
[45] Date of Patent: Aug. 19, 1986

[54] TOOL INDEXING DEVICE

[76] Inventor: Allen J. Weaver, 1108 S. 37th St., Kansas City, Kans. 66106

[21] Appl. No.: 550,368

[22] Filed: Nov. 10, 1983

[51] Int. Cl.⁴ ............................................. B23B 39/16
[52] U.S. Cl. .................................... 409/221; 269/71; 408/52; 408/98
[58] Field of Search ............... 269/71, 68, 59; 408/46, 408/91, 109, 117, 241 S, 98, 52, 42, 53, 92, 98, 99, 100, 101, 102; 409/219, 220, 221, 225, 226

[56] References Cited

U.S. PATENT DOCUMENTS

| | | | |
|---|---|---|---|
| 452,053 | 5/1891 | Richards | 408/52 |
| 1,027,347 | 5/1912 | Lassiter et al. | 408/42 X |
| 1,253,594 | 1/1918 | Hasty | 408/53 |
| 1,265,238 | 5/1918 | Morton | 408/52 |
| 1,329,663 | 2/1920 | Hill | 408/42 X |
| 1,500,231 | 7/1924 | Carpenter | 408/42 |
| 1,710,744 | 4/1929 | Roe | 408/4 |
| 2,506,202 | 5/1950 | Folkerth, Sr. | 74/665 R |
| 3,225,636 | 12/1965 | Schott et al. | 408/98 X |
| 3,266,536 | 8/1966 | Pfeifer | 408/97 X |
| 3,293,971 | 12/1966 | Kuss | 408/91 X |
| 3,491,809 | 1/1970 | Schneider | 408/42 X |
| 3,572,680 | 3/1971 | Neff | 409/219 X |
| 3,656,930 | 4/1972 | Hochstatter | 269/59 X |
| 3,740,048 | 6/1973 | Lassy et al. | 269/59 |
| 3,822,958 | 7/1974 | Lewis | 408/46 |
| 3,915,442 | 10/1975 | Marantette et al. | 269/71 |
| 4,013,280 | 3/1977 | Chitayat et al. | 269/71 X |
| 4,061,431 | 12/1977 | Strange et al. | 356/227 |
| 4,145,160 | 3/1979 | Wiggins | 408/109 X |
| 4,239,197 | 12/1980 | Olstad | 269/68 |
| 4,305,439 | 12/1981 | Skinner | 409/220 X |
| 4,354,779 | 10/1982 | Vaughan | 408/241 S |

FOREIGN PATENT DOCUMENTS 2812295 10/1979 Fed. Rep. of Germany ........ 408/98

Primary Examiner—Gil Weidenfeld
Assistant Examiner—Glenn L. Webb
Attorney, Agent, or Firm—Litman, Day & McMahon

[57] ABSTRACT

A tool indexing device includes a stand with a track structure. A platform for a workpiece is mounted on the track structure and movable in a first direction. A first indexing mechanism is provided for indexing the platform in a first direction relative to the stand and a second indexing mechanism is provided for indexing the workpiece in a second direction relative to the platform. A method of using the tool indexing device for gang drilling shelf support receivers in cabinet panels is provided. The method includes the steps of placing a panel on the platform, indexing the platform relative to the stand at a first position in the first direction with the first indexing mechanism, indexing the panel relative to the platform in the second direction with the second indexing mechanism, gang drilling a plurality of receivers in the panel, moving the platform to a second position in the first direction, indexing the platform at the second position with the first indexing mechanism and gang drilling a second plurality of receivers in the panel.

17 Claims, 13 Drawing Figures

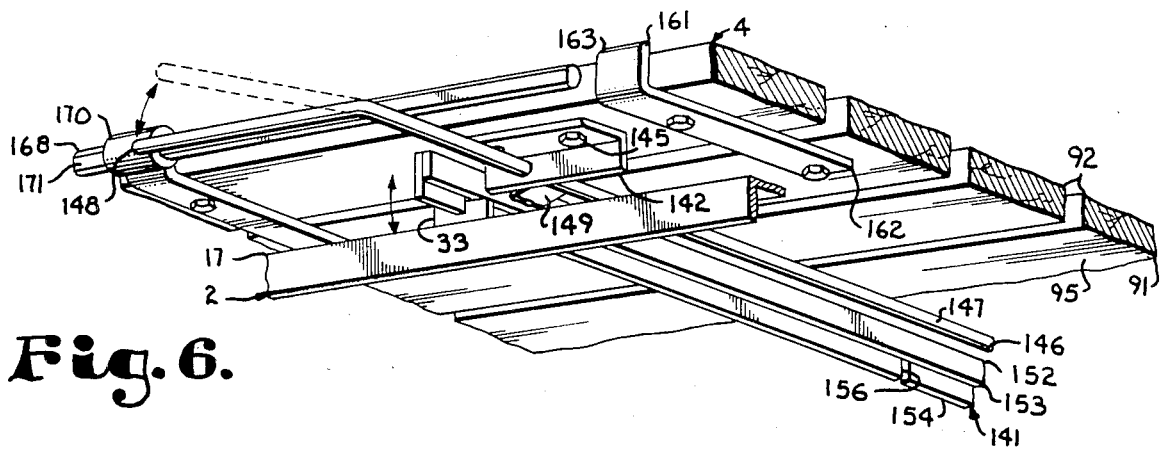
Fig. 6.
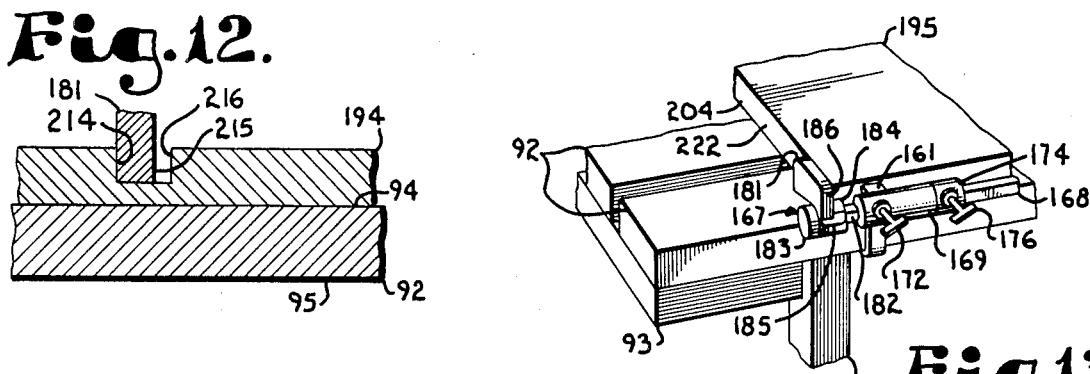
Fig. 12.
Fig. 13.
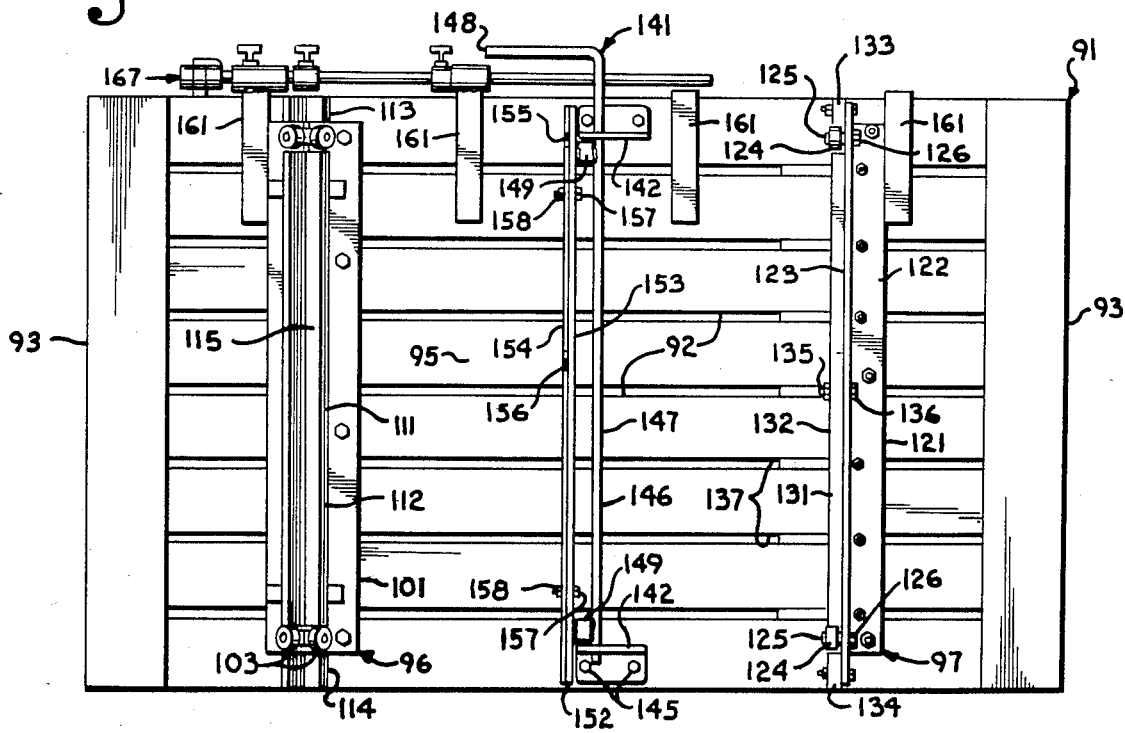
Fig. 7.

TOOL INDEXING DEVICE

BACKGROUND OF THE INVENTION

1. Field of the Invention.

The present invention relates to a tool indexing device and, more particularly, to a device for indexing gang drilling operations in cabinet panels.

2. Description of the Prior Art.

Tool indexing devices are well known in the prior art and generally function to position or align a workpiece with a tool. For example, a pilot hole borer for gang drilling precisely located pilot holes in cabinet doors for cabinet hinge mounting screws is shown in the Strange, et al. U.S. Pat. No. 4,061,437. Strange et al. disclose extensible and retractable indexing pins for precisely positioning a cabinet door on a vertical fence. A multiple drill assembly is mounted on the other side of the fence and is pneumatically actuated by an operator to extend the drill bits of the drill assembly through the fence and into a cabinet door and to retract the drill assembly when the gang drilling operation is completed.

Gang or multiple drills are also well known in the prior art and various types have heretofore been developed to suit the requirements of particular applications. A common type of gang drill includes a drill mechanism vertically movably mounted over a support for a workpiece. A plurality of tools such as twist drills and the like project downwardly from the drill mechanism and are positioned in evenly spaced, linearly aligned relation. The tools are received in respective spindles which are typically driven by a common motor. For example, the Richards U.S. Pat. No. 452,053 shows a main drive shaft with worm gears adapted for engaging worm wheels on vertical crank shaft operably connected to the drill spindles in a machine for multiple drilling heavy boiler plate. The multiple drill spindles disclosed in the Morton U.S. Pat. No. 1,265,238 are operably interconnected with each other and with a common motor by a system of drive and idler gears. Yet another type of gang drill drive system is shown in the Hill U.S. Pat. No. 1,329,663 wherein chain-driven sprockets are provided.

Gang drills are used where repetitious drilling of holes with consistent spacing and/or depth is required. One such application is in the manufacture of cabinets with adjustable shelving. Many types of cabinets include internal shelves which are vertically adjustable so that objects of various heights can be accommodated. The shelves may be supported by dowel rods or specifically designed supports including pins which are placed in receivers in the cabinet ends and dividers. Each shelf generally rests on a pair of supports at each end thereof and possibly additional supports in mid-span. By providing a plurality of vertically spaced receivers in a pair of columns on each cabinet end and divider, a corresponding set of four or more receivers may be selected for supporting a shelf fairly close to any desired position within the cabinet. Preferably the sets of corresponding receivers are horizontally coplanar so that the shelves will be level when installed.

Gang drills are well adapted for multiple drilling the cabinet ends and dividers with columns of shelf support clip receivers. For example, gang drills designed for this purpose are available from Ritter Manufacturing located in Antioch, Calif. The Ritter gang drills utilize holddowns for securing the workpiece to a platform during drilling operations. However, heretofore there has not been available a tool indexing device particularly suitable for multiple drilling shelf support recievers in cabinet ends and dividers. Many cabinets are constructed with cabinet ends and dividers of different sizes which necessitate calculating receiver placement and workpiece alignment separately for cabinet ends and dividers. Alignment for multiple drilling of cabinet ends and dividers is further complicated by the different thicknesses of materials which are commonly employed in cabinet making, since the material thickness will effect the placement of the shelf support receivers even in cabinets which are otherwise identical.

In using many prior art multiple drills, including the Ritter models, the operator had to manually align each workpiece on the drill platform before initiating the drilling operation. Manual alignment of cabinet ends and dividers on prior art gang drills tends to be relatively inaccurate and time-consuming. Furthermore, it is relatively easy for the operator to make a mistake manually aligning a cabinet end or divider. The resulting misaligned receivers may either ruin the workpiece or necessitate its redrilling. If the misalignment is not discovered until the cabinet is assembled, replacement or redrilling of the defective cabinet end or divider may be particularly difficult or time-consuming.

SUMMARY OF THE INVENTION

In the practice of the present invention, a tool indexing device is provided which avoids many of the aforementioned problems with prior art multiple drills, particularly when utilized for gang drilling shelf support receivers in cabinet panels. The tool indexing device includes a stand with a track structure having parallel track rods extending in a first direction. A platform for a workpiece is mounted on the track structure and movable relative to the stand in the first direction. A multiple drill is vertically movably mounted on the stand above the platform. A first indexing mechanism is provided for securing the platform to the stand in predetermined positions in the first direction. A second indexing mechanism is provided for indexing the workpiece in a predetermined position in the second direction on the platform.

A method of gang drilling shelf support receivers in cabinet panels is provided which includes the steps of placing a panel on the platform, indexing the platform relative to the stand at a first predetermined position in the first direction with the first indexing mechanism, indexing the panel relative to the platform in the second direction with a second indexing mechanism, gang drilling a first plurality of receivers in the panel, moving the platform in the first direction to a second predetermined position, indexing the platform at the second position with the first indexing mechanism and gang drilling a second plurality of receivers in the panel.

The principal objects of the present invention are: to provide a tool indexing device; to provide such a device with a platform for a workpiece movably mounted on a stand; to provide such a device with a first indexing mechanism for positioning the platform in predetermined positions in a first direction relative to the stand; to provide such a device with a second indexing mechanism for positioning the workpiece in a predetermined position in a second direction relative to the platform; to provide such a device which automatically indexes cabinet panels at a plurality of positions in the second direction relative to the platform; to provide such a device which accurately indexes the platform and the cabinet panels for drilling; to provide such a device which may be set for indexing and drilling both cabinet end panels and dividers without further adjustment; to provide such a device which is adapted for gang drilling cabinet panels of different thicknesses; to provide such a device which is adapted for limiting the depth of penetration of the receivers drilled in the cabinet panel; to provide such a device which is adapted to accurately and consistently gang drill pluralities of shelf support receivers in cabinet panels; and to provide such a device which is easy to use, efficient in operation, economical to manufacture, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is a fragmentary, perspective view of the tool indexing device, particularly showing a front-to-back indexing mechanism.

FIG. 7 is a bottom view of the tool indexing device, particularly showing a platform thereof.

FIG. 12 is a fragmentary, cross-sectional view taken generally along line 12—12 in FIG. 8.

FIG. 13 is a fragmentary, perspective view of the platform with a cabinet divider panel thereon.

DETAILED DESCRIPTION OF THE PREFERRED EMBODIMENTS

Figure 1:
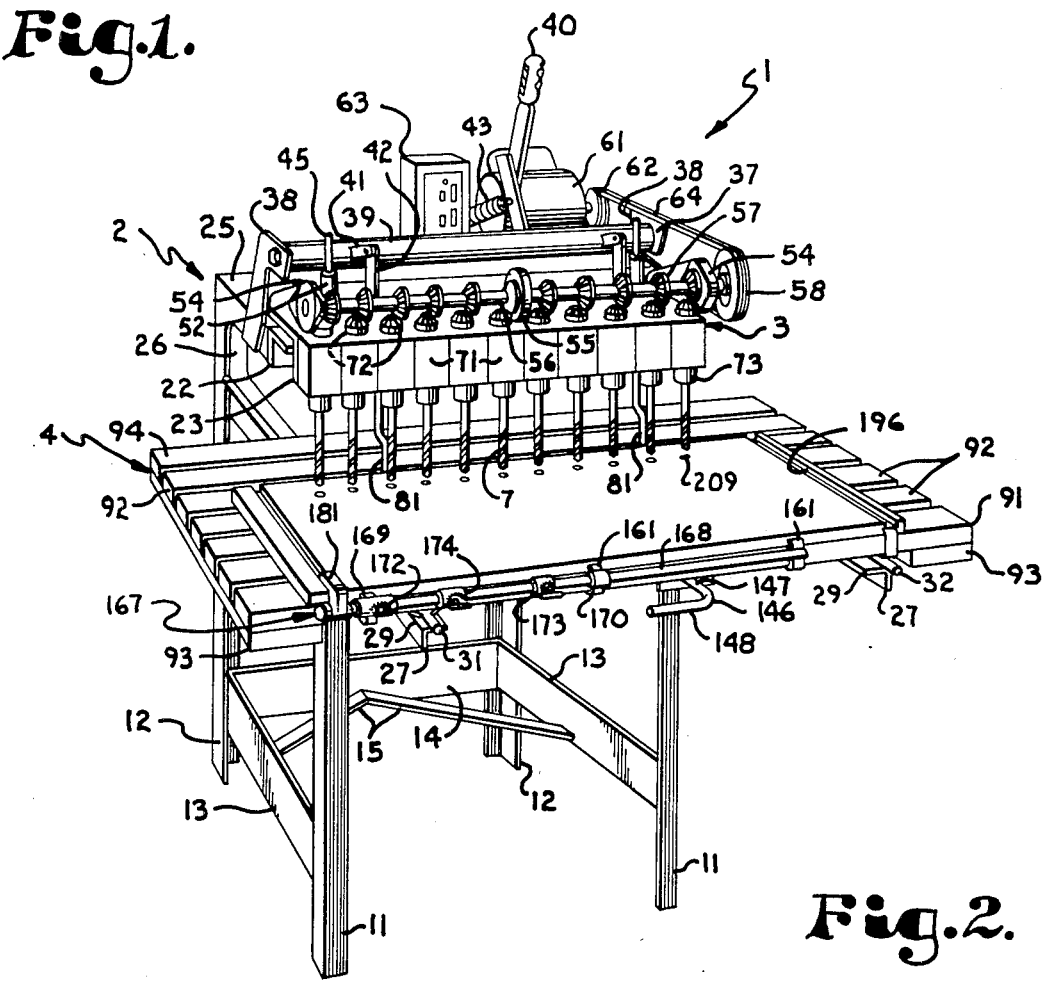
FIG. 1 is a perspective view of a tool indexing device for a multiple drill embodying the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a tool indexing device which embodies the present invention. The tool indexing device generally comprises a stand 2 with a multiple drill 3 mounted thereon and a platform 4.

I. STAND

The stand 2 includes front and back pairs of angle-section corner posts 11, 12. A pair of side braces 13 each extends between respective front and back corner posts 11, 12 and a back brace 14 extends between the back corner posts 12. Diagonal braces 15 interconnect the side and back braces 13, 14. A pair of angle-section upper side members 16 extends from the upper ends of respective front corner posts 11 to respective back corner posts 12. An angle-section upper front member 17 interconnects the upper ends of the front corner posts 11.

The back corner posts 12 are taller than the front corner posts 11 and have a pair of top side members 21 extending forwardly from their respective upper ends. The top side members 21 are interconnected by angle-section front, intermediate and back top cross members 22, 23 and 24. Thus, a top section 25 of the stand 2 is formed which cantilevers forwardly from the back corner posts 12. The top section 25 is partly supported by a pair of C members 26 which interconnect upper side members 16 and top side members 21.

A pair of track structures 27 are mounted on respective side members 16 and cantilever forwardly from the front corner posts 11. Each track structure 27 includes a respective left or right track rod 31, 32 with a circular cross-sectional configuration mounted on a respective angle-section track rod support 29. The track rod supports 29 are mounted on the side members 16 by mechanical fasteners 30 comprising, for example, nuts and bolts.

A detent 33 is mounted on the front member 17 approximately mid-way between the track structures 27 and includes a base plate 34 and an upstanding leg 35. The detent 33 is secured to the front member 17 by mechanical fasteners 36 extending through its base plate 34 and the front member 17.

A mounting apparatus 37 for the multiple drill 3 is attached to the stand top section 25 and includes a pair of upstanding arms 38 with a torque tube 39 pivotally connected thereto and extending therebetween. A handle 40 is affixed to the torque tube between the arms 38 and a pair of proximate levers 41 extend forwardly from adjacent the arms 38. The proximate levers 41 are pivotally connected to a pair of distal levers 42. A return spring 43 is attached at its respective opposite ends to the handle 40 and the back top cross member 24. A pair of upright multiple drill guide standards 45 are attached to the front top cross member 22 in transversely spaced relation.

II. MULTIPLE DRILL

The multiple drill 3 includes an angle-section, transverse, multiple drill bar 51 with a pair of sleeves 52 slidably receiving respective guide standards 45. A pair of lever mounting blocks 53 are attached to the bar 51 and are pivotally connected to respective distal levers 42.

A pair of side bearing assemblies 54 are mounted at either end of the bar 51, and a middle bearing assembly 55 is mounted therebetween. A drive shaft 56 is journaled in the bearing assemblies 54, 55 and includes a plurality of bevel pinion gears 57 mounted in spaced relation therealong and a drive shaft pulley 58 mounted at the right end thereof. A motor 61 including a motor pulley 62 is mounted on the stand top section 25 and controlled by a switch box 63. An endless drive belt 64 is trained over the drive shaft and motor pulleys 58, 62.

A plurality of drill spindle assemblies 71 are attached to the bar 51 in juxtaposed, transversely aligned relation. Each drill spindle assembly 72 includes a respective bevel pinion gear 72 meshing with and driven by a respective bevel pinion gear 57 on the drive shaft 56 and a drill chuck 73 receiving a respective twist drill 74. A pair of depth-stop arms 81 are adjustably mounted in respective receivers 82 in the bar 51 by depth adjustment nuts 83 threadably received on threaded portions 84 thereof. The depth-stop arms 81 extend through respective oversize openings 85 in the front top cross member 22. The depth-stop arms 81 are vertically adjustable with respect to the multiple drill 3 by means of the adjustment nuts 83 whereby the drilling depth of the twist drills 74 is correspondingly adjustable.

III. PLATFORM

The platform 4 generally comprises a wood frame deck 91 with top and bottom surfaces 94, 95 and a plurality of juxtaposed, transverse wood slats 92 bolted at their respective opposite ends to a pair of front-to-back wood stringers 93 on the deck bottom surface 95.

The platform 4 is movably supported on the stand 2 by left and right roller assemblies 96, 97 attached to the deck bottom surface 95 on the undersides of the slats 92 and each rollably engages a respective track rod 31, 32. The left roller assembly 96 includes a base plate 101 bolted to the deck bottom surface 95 and extending front-to-back with respect to the platform 4. A pair of V-shaped roller mounting brackets 102 are attached to and depend from the front and back ends of the base plate 101. A respective pair of rollers 103 is mounted on each bracket 102 with bolts 104 coaxial with respective roller rotational axes. Each roller 103 is placed on a respective bracket leg 105 with its rotational axis normal thereto. Therefore, the rotational axes of each pair of rollers 103 converge upwardly with respect to each other and diverge downwardly. The rollers 103 are positioned so that their faces 106 engage the left track rod 31 along respective lines extending the length of the left track rod 31 in the left and right upper quadrants thereof.

A left track rod cover 111 is provided which includes a middle section 112 between the brackets 102 and front and back sections 113, 114. The rod cover 111 includes a downwardly open groove 115 which receives the left track rod 31. The cover middle section 112 includes pins 116 extending from its opposite ends which are received within the bracket legs 105. The cover middle section 112 is thus loosely mounted on the left roller assembly 96 and rests on the left track rod 31. The left track rod 31 engages the cover 111 in sliding engagement within its groove 115 approximately along the lines of contact between the left track rod 31 and the rollers 103. The rod cover 111 functions to wipe the lines of contact clear of foreign matter in general and drillings from the workpiece in particular. The right roller assembly base plate 101 also functions to shield the left track rod 31.

The right roller assembly 97 includes an angle-section member 121 with a base leg 122 bolted to the platform slats 92 and a vertical leg 123 depending downwardly from the deck bottom surface 95. A pair of rollers 124 are mounted on the inside of the vertical leg 123 with bolts 125 and nuts 126.

A right track rod cover 131 comprises a wood slat with a middle section 132 positioned between the rollers 124 and front and back sections 133 and 134. The middle section 132 is attached to the member vertical leg 123 by a bolt 135 and nut 136 loosely received within an oversize receiver (not shown) in the middle section 132. Therefore, the right track rod cover 131 rests loosely on the right track rod 28 and engages it approximately along the line of contact between the right rollers 124 and the right track rod 32. The right track rod cover 131 clears the right track rod 32 of foreign matter. A plurality of spacers 137 are placed between the slats 92 inwardly from the angle section member 121 and shield the right track rod 32, as does the angle-section member base leg 122.

The indexing device of the present invention includes a front-to-back indexing mechanism 141 with a pair of angle-section brackets 142 fastened on the undersides of the frontmost and rearmost slats 92 by bolts 145. A torque rod 146 is formed in an L-shaped configuration with a front-to-back leg 147 pivotally journaled within receivers in the brackets 142 and a handle leg 148 located in front of the platform deck 91. A pair of connecting bars 149 extend from the torque rod front-to-back leg 147 approximately in the direction the handle leg 148 extends therefrom and are positioned between and adjacent the respective brackets 142.

An indexing bar 152 includes a mounting strip 153 attached to the connecting bars 149 and a detent strip 154 with front and back slots 155, 156 for receiving the detent leg 35 to secure the platform 4 in predetermined positions with respect to the stand 2 and the multiple drill 3. The strips 153 and 154 are connected by bolts 157 and nuts 158. The detent strip 154 may be readily removed from the mounting strip 153 for replacement with, for example, another detent strip having a different spacing or number of slots corresponding to a desired hole pattern in a workpiece.

A plurality of front stops 161 include respective base legs 162 bolted to the undersides of the front two slats 92 and vertical legs 163 extending upwardly therefrom above the level of the top surface 94 of the platform deck 91. A transverse indexing mechanism 167 includes an index shaft 168 slidably mounted within left and right sleeves 169, 170 attached to the vertical legs 163 of the front stop vertical legs 163 on the left-hand side of the platform 4 so that the index shaft 168 extends horizontally and transversely with respect to the tool indexing device 1 in spaced relation in front of the platform deck 91. The index shaft 168 has a flat 171 with extends longitudinally therewith and is engaged by a wing bolt 172 for clamping the shaft 168 within the left sleeve 169.

Between the sleeves 169, 170 right and left index stop clamps 173, 174 are slidably disposed on the shaft 168. Each index clamp 173, 174 includes a clamp body 175 with a transverse receiver (not shown) for the index shaft 168 and a front-to-back threaded receiver (also not shown) for a respective wing bolt 176 adapted for engaging the shaft flat 171. An index arm 181 is journaled on a left end 182 of the index shaft 168 and includes an arm 183 having a thickness of approximately one-half inch. The index arm 181 is freely rotatable with respect to the index shaft 168 about a limited arc of movement and is journaled on the index shaft 168 between left and right bushings 183, 184. The right bushing 184 includes a stop 185 for engaging bight portions 186, 187 on the index arm 188 to limit its rotational movement with respect to the index shaft 168.

IV. OPERATION

Figure 2:
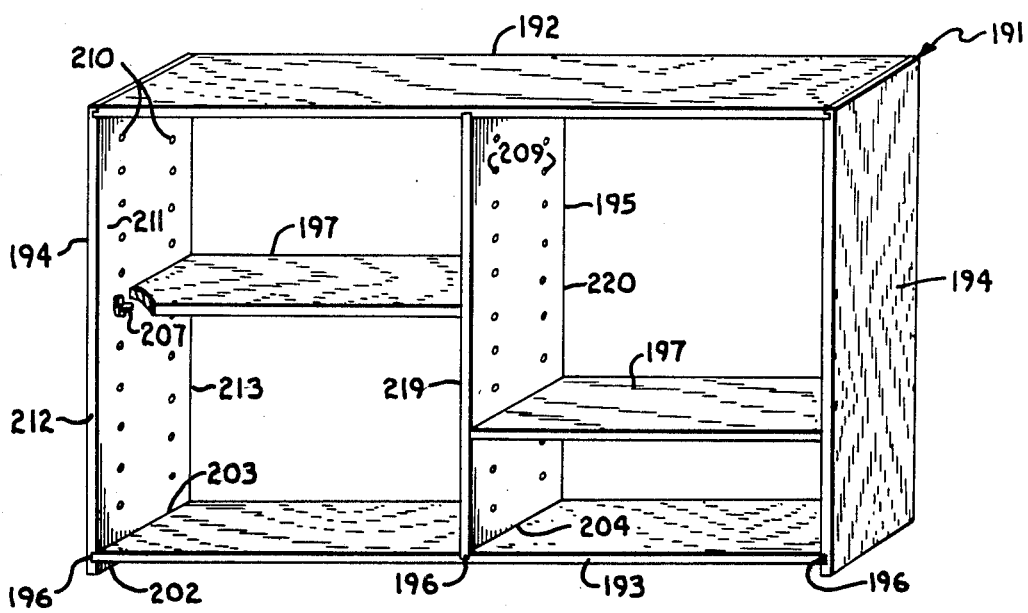
FIG. 2 is a perspective view of a cabinet assembly.
Figure 3:
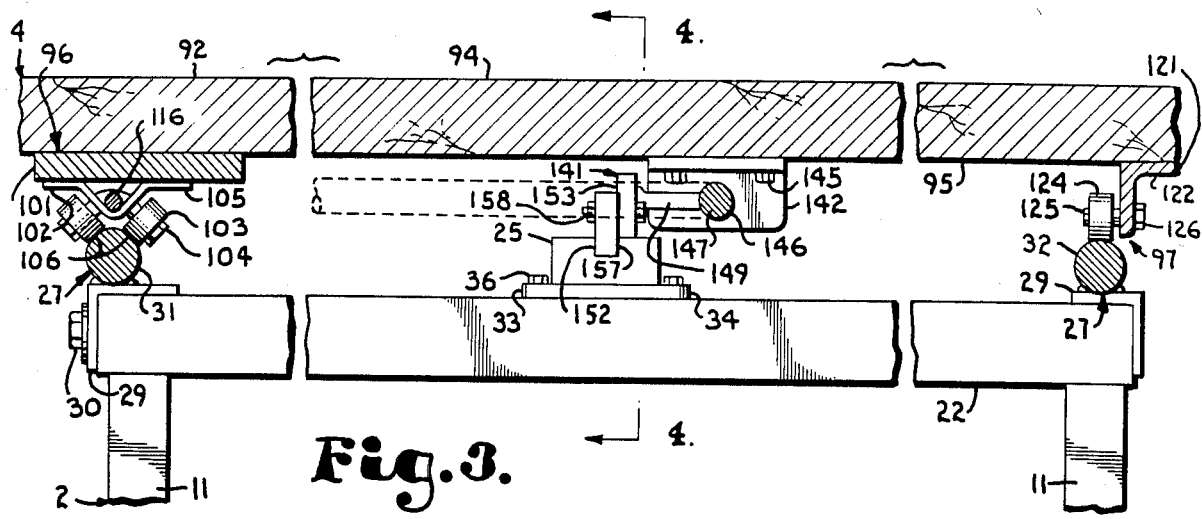
FIG. 3 is a fragmentary, transverse, cross-sectional view of the tool indexing device.
Figure 4:
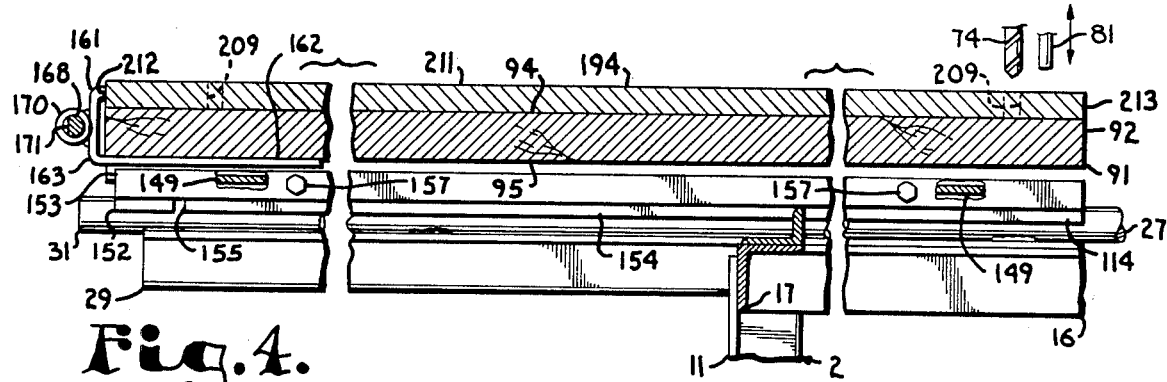
FIG. 4 is a fragmentary, front-to-back, cross-sectional view of the tool indexing device.
Figure 5:
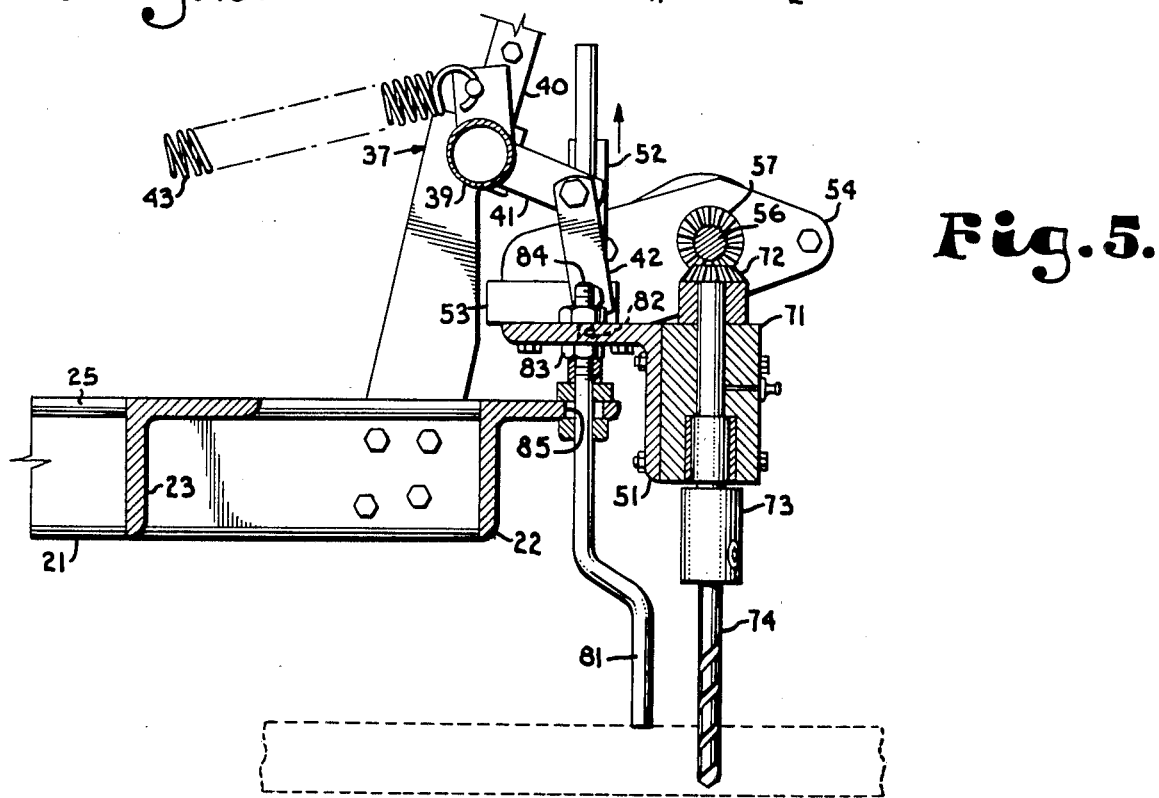
FIG. 5 is a transverse, cross-sectional view of the multiple drill.

Without limitation on the generality of useful applications for the tool indexing device 1, a method of using same in the manufacture of a cabinet 191 is disclosed. As shown in FIG. 2, the cabinet 191 includes top, bottom, end and divider panels 192, 193, 194 and 195 interconnected by respective dado joints 196. A pair of adjustable shelves 197 is placed between respective end panels 194 and the divider 195.

Dados 201 are cut into the end panels 194 slightly above their respective lower edges 202 for receiving opposite ends 203 of the bottom panel 193. Dados are also formed in the bottom 193 approximately mid-way thereacross for receiving a lower end 204 of the divider 195. The cabinet panels 192, 193, 194 and 195 are formed from ¾ inch thick (1 inch thick nominal) material and the dados 201 are each approximately ¼ inch deep.

Each shelf 197 is supported on four supports 207 including pins (not shown) received in support receivers 209 in the cabinet end and divider panels 194, 195. The receivers 209 are arranged in pairs of parallel, vertical receiver columns 210 on each end panel 194 and through the divider panel 195.

Figure 8:
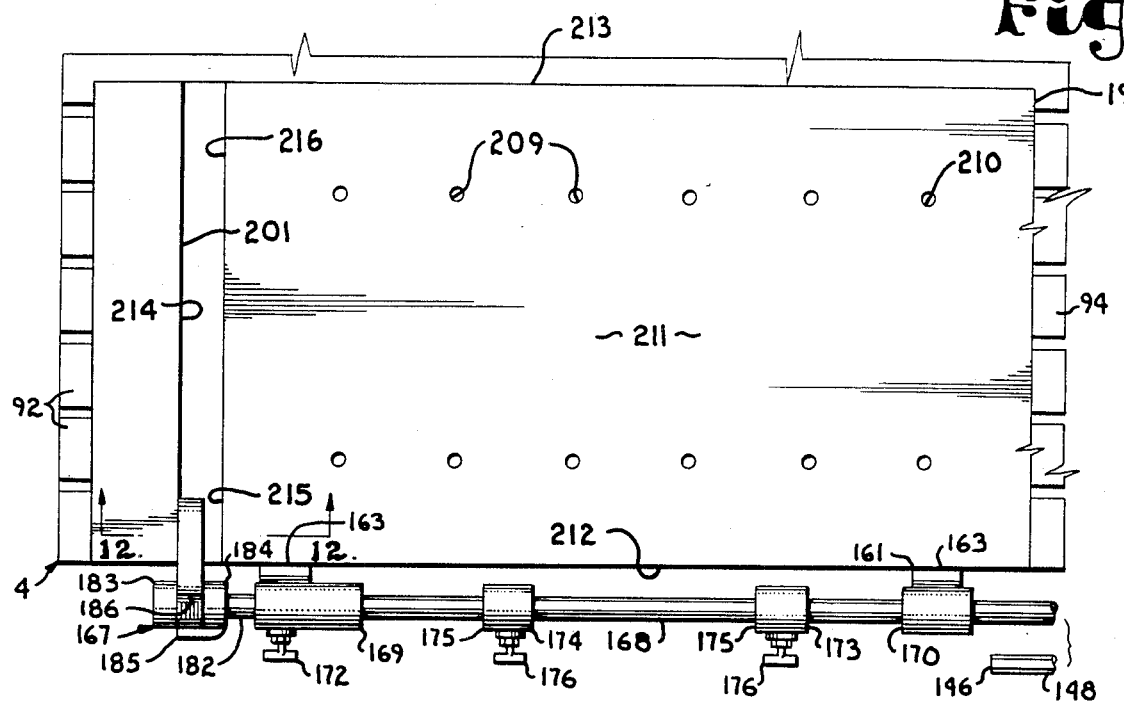
FIG. 8 is a top plan view of the platform with a $\frac{3}{4}$ inch thick cabinet end panel thereon.

In the disclosed method of drilling the receiver columns 210 with the multiple drill 3, an end panel 194 is placed on the platform deck top surface 94 with an inside face 211 thereof up and front or back edges 212 or 213 thereof engaging the front stop vertical legs 163 as shown in FIG. 8. The index arm 181 is placed in the dado 201 against a dado lower edge 214 whereby a gap 215 of approximately ¼ inch (¾ inch wide dado 201 less ½ inch wide arm 181) is provided between the arm 181 and a dado upper edge 216.

The wing bolt 172 is set to lock the index shaft 168 at a position whereat the twist drill bits 69 are aligned with a desired location for the receiver column 210. The platform 4 is positioned on the stand 2 so that the detent 33 is received in one of the detent strip slots 155 or 156. The operator then gang drills a receiver column 210 to a predetermined depth whereat the depth stop arms 83 engage the end panel inside face 212. The handle leg 148 is then raised to disengage the detent 33 from the slot 155 or 156 and the platform 4 is moved forwardly on the stand 2 until the other detent strip slot 155 or 156 receives the detent 33 whereat the platform 4 is properly positioned for drilling the other receiver column 210 in the end panel 194. The detent strip 154 will slide along the detent leg 35 until a slot 155 or 156 is aligned with the leg 35 at which location the torque rod 146 pivots within the brackets 142 and drops the detent strip 154 over the detent leg 35 under the influence of gravity.

Figure 9:
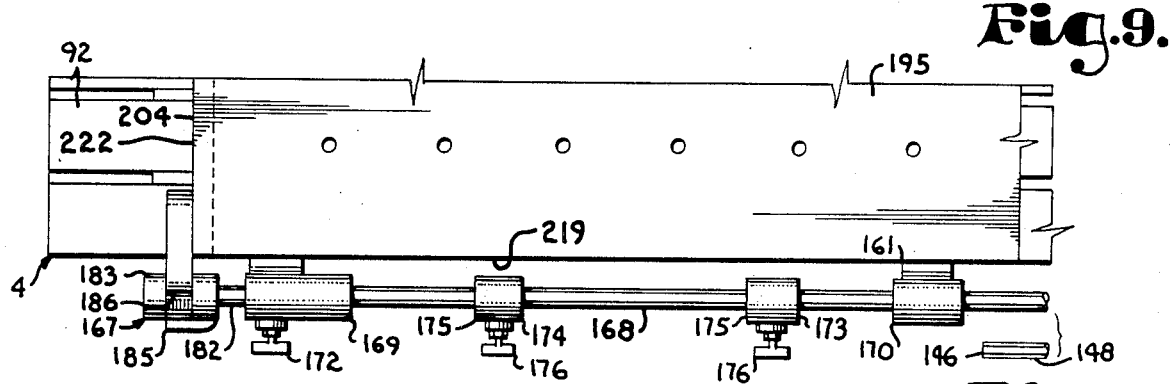
FIG. 9 is a top plan view of the platform with a $\frac{3}{4}$ inch thick cabinet divider panel thereon.

The divider 195 is placed on the platform deck 91 with a front edge 219 or back edge 220 thereof in engagement with the front stop vertical legs 163 and a lower edge 222 thereof against the index arm 181 as shown in FIG. 9. A pair of receiver columns 210 are then gang drilled in the divider 195 in the same manner as with the end panels 194. For drilling the divider 195 the depth stop arms may be left in their setting for the end panels 194 and both sides drilled or, alternatively, the depth stop arms 83 may be adjusted to allow the divider 195 to be drilled completely through in one operation.

The resulting receiver columns 210 in the cabinet 191 are aligned in coplanar relation because the index arm 181 positions the end panels 194 and the divider 195 so that each receiver 209 is positioned the same height above the cabinet bottom 193 as corresponding receivers 209. Relative to the end panels 194 and the divider 195, the index arm 181 occupies the space which will be occupied by the lower ¼ inch of the ¾ inch thick cabinet bottom 193. The ¼ inch gap between the index arm 181 and the dado upper edge 216 on the end panels 194 compensates for the ¼ inch of the divider panel lower end 204 which extends into the cabinet bottom panel dado 201. Each another way, the left edge of the index arm 181 is at the level of the underside of the cabinet bottom 193 with respect to the end panels 194 and the divider panel 195.

Figure 10:
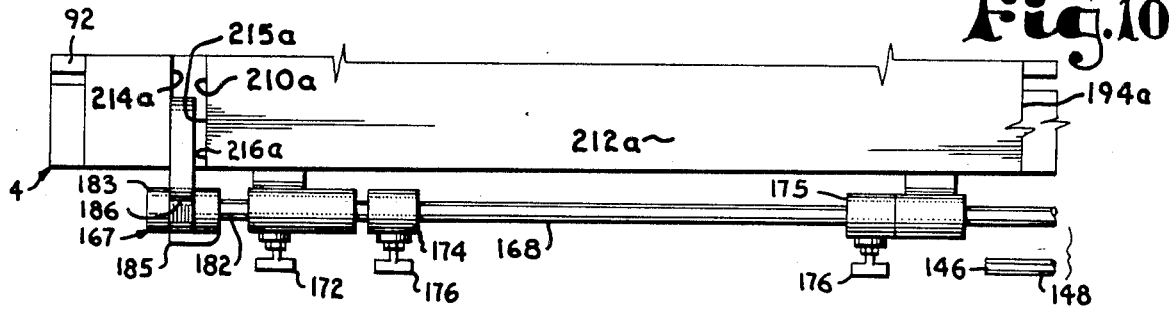
FIG. 10 is a top plan view of the platform with a $\frac{5}{8}$ inch thick cabinet end panel thereon.
Figure 11:
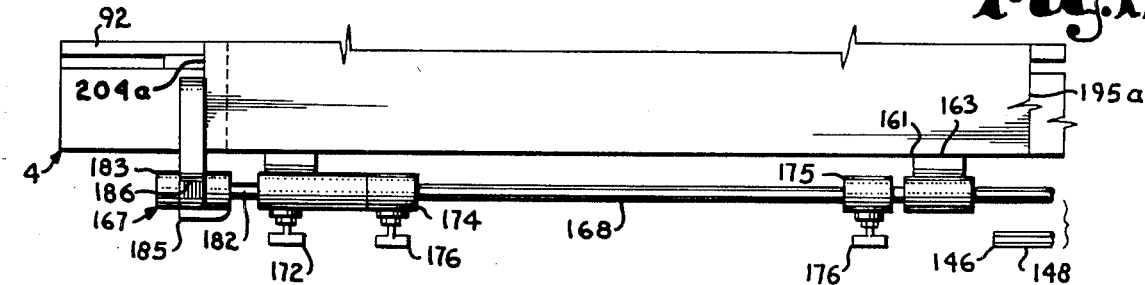
FIG. 11 is a top plan view of the platform with a $\frac{5}{8}$ inch thick cabinet divider panel thereon.

A method of using the gang tool 1 for gang drilling end panels 194a and divider panels 195a comprising ⅝ inch thick material is also disclosed and the placements therefor and shown in FIGS. 10 and 11 respectively. The end panel 194a is placed on the platform deck 91 with an inside face 212a thereof up and the index arm 181 against a lower edge 214a of a dado 201a. With the end panel 194a properly positioned, a ⅛ inch gap 215a (⅝ inch thick material less ½ inch wide index arm 181) is provided between the index arm 181 and a dado upper edge 216a. The right index clamp 173 is abutted against the right sleeve 170 and a ⅛ inch gap is provided between the left index clamp 174 and the left sleeve 169.

The dados 201a are approximately ⅜ inch wide and onequarter inch deep, leaving ⅜ inch of material between the dado bottom and the opposite face of an end panel 194a or a bottom panel (not shown). Therefore, since the index arm 181 is approximately one-half inch wide, the ⅛ inch discrepency must be compensated for before the divider panel 195a is gang drilled. The wing bolt 172 is loosened and the index shaft 169 moved to the left ⅛ inch so that the left index clamp 174 engages the left sleeve 169 and a ⅛ inch gap is provided between the right index clamp 173 and the right sleeve 170. The wing bolt 176 is retightened and the ⅝ inch material divider panel 195a is placed on the platform deck 91 with its lower edge 222a against the index arm 181. Thus, when the tool 1 is employed for drilling ⅝ inch thick material, the index shaft 168 is shifted ⅛ inch each time the operator switches between drilling end panels 194a and divider panels 195a. It will be appreciated that other thicknesses of materials may likewise be accommodated by adjusting the index clamps 173 to compensate for dimensional differences or by using different index arms with appropriate widths.

During the gang drilling operations described hereinabove, each cabinet end and divider panel 194, 194a, 195, 195a is precisely positioned with respect to the platform 4 by the indexing mechanisms 141 and 167. Furthermore, the depths of the receivers 209 are controlled by the depth stop arms so that each may be drilled to a predetermined depth, regardless of the thickness of material. Therefore, relatively precise positioning of the receivers 201, 201a is accomplished without the need for manual positioning of each workpiece with the resultant greater possibility of error.

It is to be understood that while certain forms of the present invention have been illustrated and described herein, it is not to be limited to the specific forms or arrangement of parts described and shown.

What is claimed and desired to be secured by Letters Patent is as follows:

1. A device for indexing a tool with respect to a workpiece, which comprises:
    (a) a stand with a track structure;
    (b) a platform for a workpiece mounted on said stand and movable in a first direction;
    (c) first indexing means for indexing said platform in said first direction relative to said stand, said first indexing means including detent means mounted on one of said stand and platform and engagement means on the other of said stand and platform for engaging said detent means at a respective predetermined position from front-to-back with respect to said stand;
    (d) second indexing means for indexing said workpiece in a second direction relative to said platform, said second indexing means including a pivotable index arm connected to said platform and adapted for engaging said workpiece;
    (e) a multiple drill including a plurality of drill means with upright drill bits;
    (f) a vertical guide standard attached to and extending from one of said stand and said multiple drill;
    (g) a guide sleeve attached to the other of said stand and said multiple drill, said guide sleeve slidably receiving said guide standard;
    (h) a mounting apparatus attached to said stand and adapted to mounting said multiple drill on said stand;
    (i) a motor mounted on said mounting apparatus and operably connected to said multiple drill; and
    (j) said multiple drill being vertically reciprocable with respect to the workpiece by said mounting apparatus.

2. The device according to claim 1, wherein said mounting apparatus includes:
    (a) an arm extending from said stand;
    (b) a torque tube pivotally connected to said arm;
    (c) proximate lever extending from a torque tube; and
    (d) a distal lever pivotally connected to said proximate lever and said multiple drill.

3. The device according to claim 1, which includes:
    (a) said multiple drill including a common, transversely-extending drive shaft operably connected to said drill means by respective rightangle gear drives.

4. The device according to claim 1 wherein said second indexing means includes:
    (a) an index shaft pivotally connected to said index arm, said index shaft being movable with respect to said platform in said second direction; and
    (b) mounting means for movably mounting said index shaft on said platform.

5. The device according to claim 4 wherein:
    (a) said mounting means comprises a pair of stops attached to said platform, each said stop including a sleeve slidably receiving said index shaft; and
    (b) said second indexing means includes a pair of index stop clamps positioned between said sleeves and each including a body with a receiver for slidably receiving said index shaft and a bolt for clamping said stop clamp to said index shaft.

6. The device according to claim 1 which includes:
    (a) depth-stop means adapted for engaging said workpiece and controlling a depth of penetration of a tool thereinto.

7. The device according to claim 6 wherein:
    (a) said depth-stop means comprises a depth stop arm vertically adjustably mounted on said tool mounted on said stand whereby said penetration depth is adjustable.

8. A device for indexing a tool with respect to a workpiece, which comprises:
    (a) a stand including a pair of parallel track rods extending in a first direction;
    (b) a platform for a workpiece having first and second roller assemblies each rollably engaging a respective track rod whereby said platform is mounted on said stand and movable in said first direction;
    (c) a multiple drill including a plurality of drill means with upright drill bits;
    (d) a vertical guide standard attached to and extending from one of said platform and said multiple drill;
    (e) a guide sleeve attached to the other of said platform and said multiple drill, said guide sleeve slidably receiving said guide standard;
    (f) a mounting apparatus having an arm extending from said stand, a torque tube pivotally connected to said arm, a proximate lever extending from said torque tube and a distal lever pivotally connected to said proximate lever and connected to said multiple drill;
    (g) first indexing means including:
        (1) a detent mounted on said stand; and
        (2) an indexing bar movably mounted on said platform, said indexing bar having a plurality of engagement means each adapted for engaging said detent at a respective predetermined position in said first direction;
    (h) second indexing means including:
        (1) an index shaft mounted on said platform and movable with respect to said platform in a second direction;
        (2) a pair of stops attached to said platform, each said stop including a sleeve slidably receiving said index shaft;
        (3) a pair of index stop clamps positioned between said sleeves and each including a body with a receiver for slidably receiving said index shaft and a bolt for clamping said stop clamp to said index shaft; and
        (4) an index arm pivotally mounted on said index shaft and adapted for engaging said workpiece; and
    (i) a motor mounted on said mounting apparatus and operably connected to said multiple drill.

9. The device according to claim 8 which includes:
    (a) depth-stop means adapted for engaging said workpiece and controlling a depth of penetration of said drills thereinto.

10. The device according to claim 8 wherein:
    (a) said first direction is front-to-back with respect to said stand; and
    (b) said second direction is transverse with respect to said stand.

11. A device for indexing a tool with respect to a workpiece, which comprises:
    (a) a stand including a pair of parallel track rods extending from front-to-back with respect to said device;
    (b) a platform for a workpiece having first and second roller assemblies each rollably engaging a respective track rod whereby said platform is movable from front-to-back with respect to said stand;
    (c) a tool mounting apparatus attached to and extending from said stand over said platform;

(d) a tool mounted on said arm over said platform;
(e) first indexing means including:
  (1) detent means mounted on one of said stand and said platform; and
  (2) an indexing bar movably mounted on the other of said stand and said platform, said indexing bar having a plurality of engagement means each adapted for engaging said detent means at a respective predetermined position from front-to-back with respect to said stand; and
(f) second indexing means including:
  (1) an index shaft mounted on said platform and movable with respect to said platform in a second direction;
  (2) a pair of stops attached to said platform, each said stop including a sleeve slidably receiving said index shaft;
  (3) a pair of index stop clamps positioned between said sleeves each including a body with a receiver slidably receiving said index shaft and clamp means for clamping said stop clamp to said index shaft; and
  (4) an index arm pivotally mounted on said index shaft and adapted for engaging said workpiece.

12. The device according to claim 2 wherein said mounting apparatus comprises:
(a) an arm extending from said stand;
(b) a torque tube pivotally connected to said arm;
(c) a proximate lever extending from said torque tube; and
(d) a distal lever pivotally connected to said proximate lever and connected to said tool.

13. The device according to claim 11 wherein:
(a) said engagement means comprise slots in said indexing bar each adapted for receiving said detent in a respective predetermined position in said first direction.

14. The device according to claim 1 which includes:
(a) a multiple tool movably mounted on said stand.

15. The device according to claim 14 which includes:
(a) said tool comprising a multiple drill with a plurality of drill means including upright drill bits, said multiple drill being vertically movable; and
(b) guide means for said multiple drill.

16. The device according to claim 15 wherein said guide means includes:
(a) a vertical guide standard attached to and extending from one of said platform and said multiple drill; and
(b) a guide sleeve attached to the other of said platform and said multiple drill, said guide sleeve slidably receiving said guide standard.

17. A device for indexing a tool with respect to a workpiece, which comprises:
(a) a stand with a track structure;
(b) a platform for a workpiece mounted on said stand and movable in a first direction;
(c) first indexing means for indexing said platform in said first direction relative to said stand;
(d) second indexing means for indexing said workpiece in a second direction relative to said platform, said second indexing means comprising:
  (1) an index arm pivotally mounted on said platform and adapted for engaging said workpiece;
  (2) an index shaft pivotally connected to said index arm, said index shaft being movable with respect to said platform in said second direction;
  (3) mounting means for movably mounting said index shaft on said platform, said mounting means including a pair of stops attached to said platform, each said stop including a sleeve slidably receiving said index shaft; and
  (4) a pair of index stop clamps positioned between said sleeves and each including a body with a receiver for slidably receiving said index shaft and a bolt for clamping said stop clamp to said index shaft;
(e) stop means for retaining said platform in a plurality of predetermined positions in said first direction;
(f) a multiple drill including a plurality of drill means with upright drill bits;
(g) a vehicle guide standard attached to and extending from one of said stand and said multiple drill;
(h) a guide sleeve attached to the other of said stand and said multiple drill, said guide sleeve slidably receiving said guide standard;
(i) a mounting apparatus attached to said stand and adapted to mounting said multiple drill on said stand;
(j) a motor mounted on said mounting apparatus and operably connected to said multiple drill; and
(k) said multiple drill being vertically reciprocable with respect to the workpiece by said mounting apparatus.

* * * * *